Aug. 28, 1945.   J. P. MARCY   2,383,611
MOTOR VEHICLE
Filed Sept. 4, 1944   3 Sheets-Sheet 1
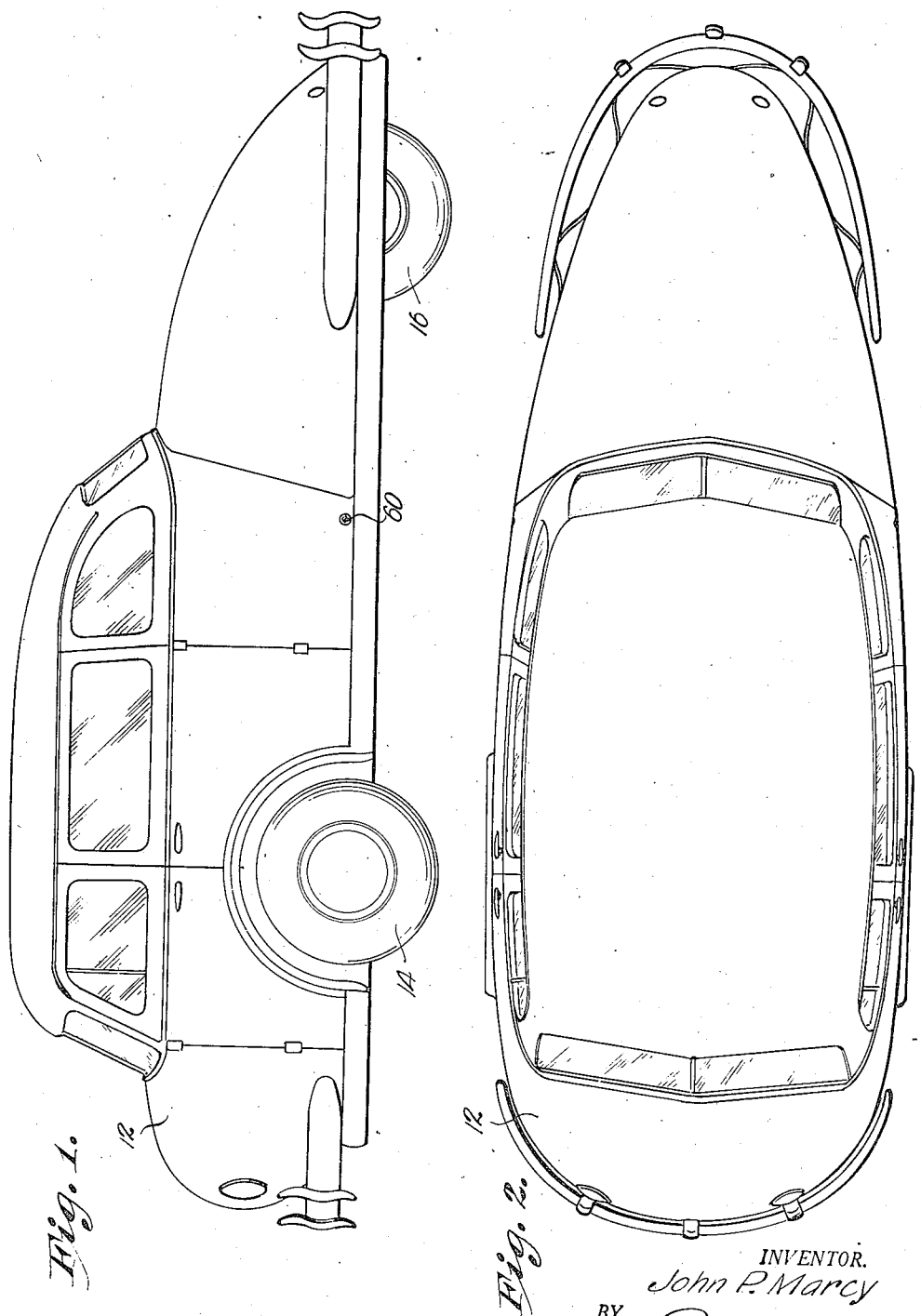
INVENTOR.
John P. Marcy
BY
ATTORNEY.

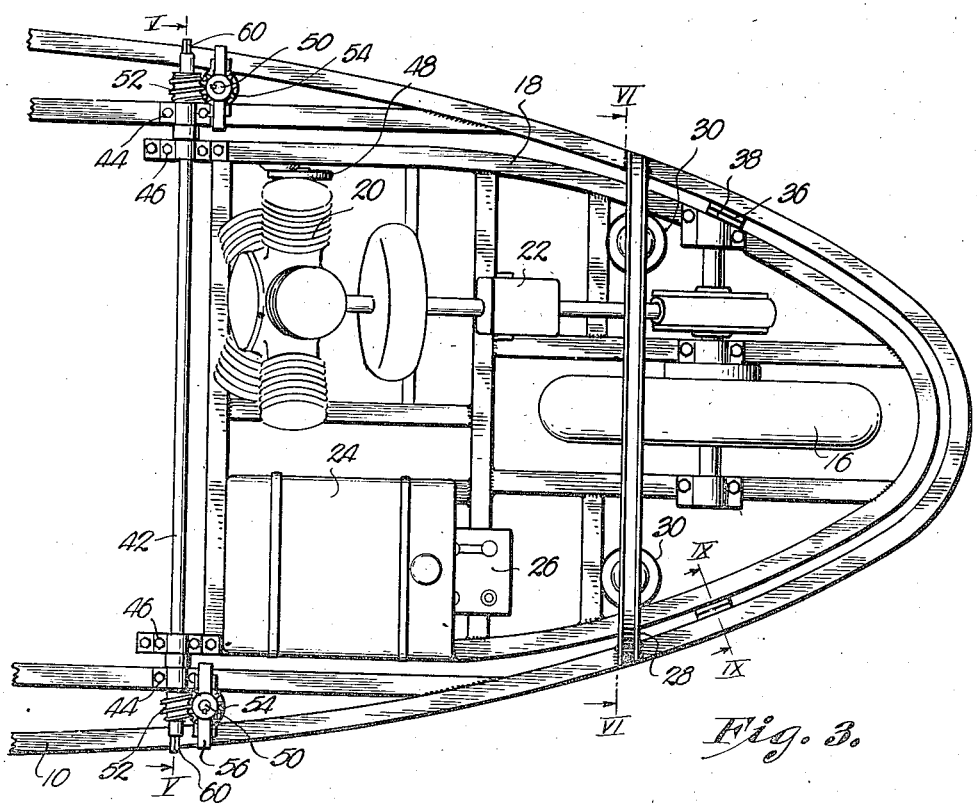
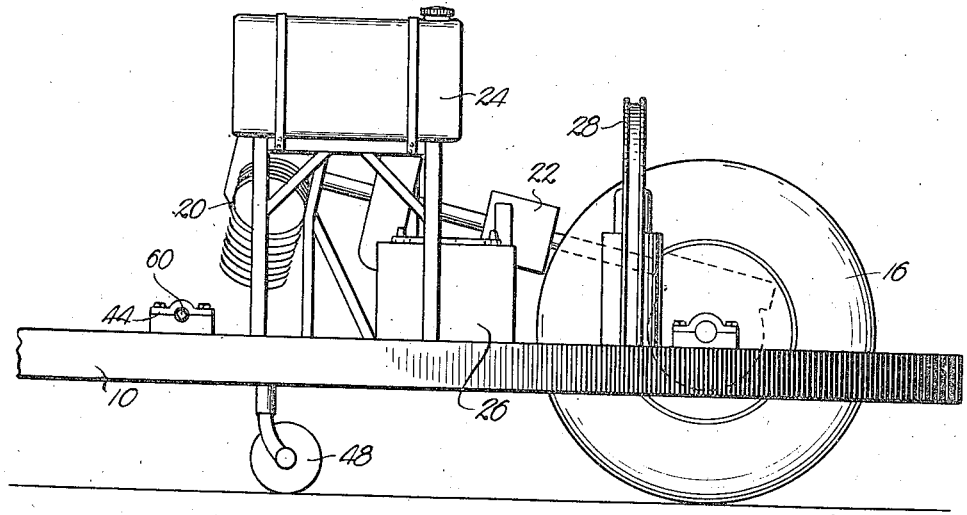

Aug. 28, 1945.　　　　J. P. MARCY　　　　2,383,611
MOTOR VEHICLE
Filed Sept. 4, 1944　　　　3 Sheets-Sheet 3

INVENTOR.
John P. Marcy
BY
ATTORNEY.

Patented Aug. 28, 1945

2,383,611

UNITED STATES PATENT OFFICE 2,383,611

MOTOR VEHICLE

John P. Marcy, Oak Ridge, Tenn.

Application September 4, 1944, Serial No. 552,583

4 Claims. (Cl. 180—11)

This invention relates to vehicles of the character adapted to carry passengers or freight, and has for its primary aim the provision of a road automobile having a complete unitary power assembly capable of being quickly and conveniently removed from the main frame of the automobile, when the necessity for repair or the like is presented.

One of the important aims of this invention is the provision of a motor vehicle having a sub-frame removably secured to the main frame in such fashion as to allow the speedy disconnection of the sub-frame, to the end that all of the parts associated therewith may be replaced as a unit and without holding the vehicle out of service due to the necessity of repairing parts that cannot be quickly disconnected therefrom.

A still further aim of this invention is to provide a motor vehicle with a removable power unit whereon is mounted not only the drive wheel for the vehicle, but the engine, gasoline tank, battery, and means for connecting the engine and drive wheel. The unit also is equipped with supporting wheels, shock absorbing elements and a frame designed to snugly fit into place adjacent to the main frame where objectionable displacement cannot occur.

It has heretofore been the practice in some automotive circles to renew the power plant of a vehicle by taking the old engine from the chassis and setting an entirely new engine in its place. Suitable allowances were made so far as consideration is concerned, and the vehicle user had a substantial part of the complete power plant assembly in a virtually new condition. Objections arose from this practice because of the time required for the change-over, and also because in numbers of instances, a new engine could not be properly fitted to operate with the drive shaft or other means of connecting the drive wheel thereto. This invention, therefore, contemplates the use of a sub-frame made with parts whereby the same may be quickly connected to the main frame of a vehicle without loss of time nor sacrifice of rigidity and endurance qualities.

In the drawings:

Fig. 1 is a side elevational view of a motor vehicle made in accordance with the present invention.

Fig. 2 is a top plan view thereof.

Fig. 3 is a fragmentary plan view of the rear portion of the main frame of the vehicle showing the power unit assembly embodying the invention, in place.

Fig. 4 is a side elevational view of the parts illustrated in Fig. 3.

Figure 5:
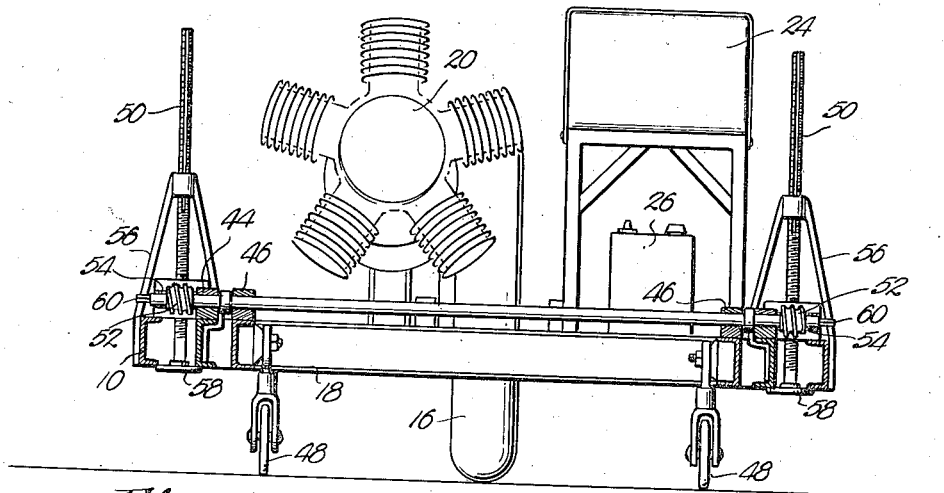
Fig. 5 is a vertical cross sectional view taken on line V—V of Fig. 3.
Figure 6:
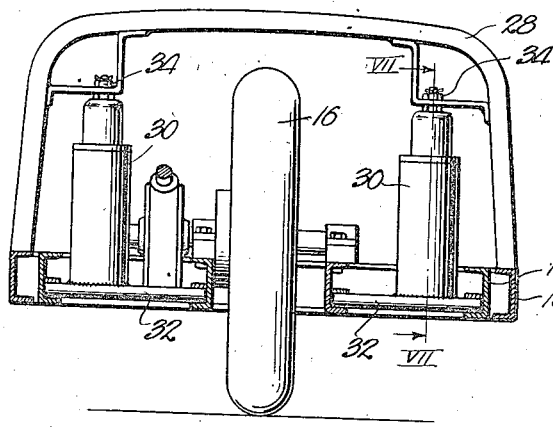
Fig. 6 is a similar view taken on line VI—VI of Fig. 3, and looking in the direction of the arrows.
Figure 7:
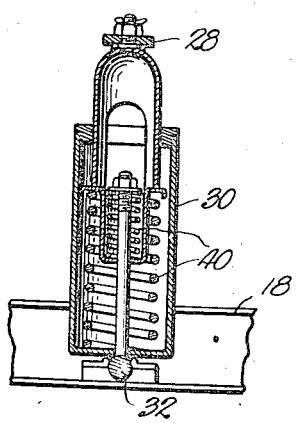
Fig. 7 is a fragmentary sectional view taken on line VII—VII of Fig. 6.

In constructing a motor vehicle capable of fulfilling the objects of the invention, the main frame 10 thereof may support a streamlined body 12 of "tear drop" form with the larger end thereof at the forward part of the vehicle. The body diminishes in size and approaches a point on the longitudinal axis of the vehicle at the rear end.

Steering wheels 14 are on each side of main frame 10 near the forward end of the vehicle and a drive wheel 16, more fully hereinafter described, is on the longitudinal axis of the vehicle at its rear end.

A sub-frame 18 carries drive wheel 16 as well as the engine 20. This engine may be of any type and is operably joined to wheel 16 through parts 22 including of course, a transmission of desired type. A gasoline tank 24, a battery 26, and connections therefrom to engine 20, not here shown, are all mounted on sub-frame 18 in order that this said frame may serve as a support for all of the elements needed to drive wheel 16. Any type of bearing may be used to mount wheel 16 so long as strength and removability are allowed.

Sub-frame 18 is substantially V-shaped to conform to the contour of the rear portion of main frame 10. Main frame 10 is provided with a yoke 28 extending upwardly and across sub-frame 18 to receive one end of shock absorbing units 30. These shock absorbing units are mounted upon stub shafts 32 journalled in sub-frame 18 and project upwardly to yoke 28 where they are secured thereto through the medium of nuts or analogous means 34. Friction plates 36 and 38, rigid with main frame and sub-frame 10 and 18 respectively, permit the relative movement between these said frames as shock absorbing elements shift in length because of compression and expansion of springs 40, forming a part thereof. These springs are housed within the case of the shock absorbing element 30.

The forward end of sub-frame 18 is secured to transverse shaft 42 journalled in bearings 44 on main frame 10. Bearings 46 on the forward ends of V-shaped sub-frame 18, have removable caps that are manipulated in a manner hereinafter described, when sub-frame 18 is to be removed from operative position in main frame 10.

Figure 8:
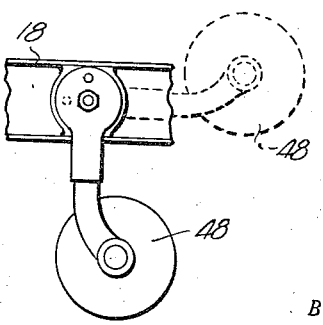
Fig. 8 is a fragmentary detailed view illustrating the supporting wheels mounted on the sub-frame.
Figure 9:
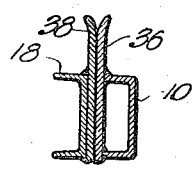
Fig. 9 is a fragmentary detailed sectional view taken on line IX—IX of Fig. 3.

A pair of supporting wheels 48 swingably secured to sub-frame 18, are yieldably held in a position shown in dotted lines of Fig. 8 (the legs of the channels of frame 18 are cut away for clearance). When the sub-frame is to be removed for replacement, wheels 48 are dropped to the condition shown in full lines of Fig. 8 and in Figs. 4 and 5. These two wheels in combination with drive wheel 16, will serve to hold the sub-frame 18 in a horizontal position.

When sub-frame 18 and all of its supported parts are to be removed from main frame 10, the latter is supported by a pair of jacks 50, one of which is disposed on each side of frame 10 adjacent to shaft 42. Shaft 42 has worm gears 52 rigid thereon to engage a nut 54 held by bracket 56 for rotation about jack 50.

Jack 50 is screw-threaded and when nut 54 is turned by rotating shaft 42 about its axis, the heads 58 of jacks 50 are lowered to the supporting surface and thereby main frame 10 is provided with means for maintaining the same in a substantially horizontal position. While so held, the main frame 10 is disconnected from sub-frame 18 by removing the caps of bearings 46, and further, by removing nuts 34 of shock absorbing elements 30. Such controls as are necessary to lead from engine 20 or transmission 22, are coupled together at the edge of sub-frame 18 and disconnected when this frame is to be removed from the operative position.

If it becomes necessary or desirable to raise or lower main frame 10 while it is being supported by jacks 50 a crank may be attached to the squared ends 60 of shaft 42.

From the foregoing it will be obvious that sub-frame 18 with all of the elements mounted thereon, may be quickly detached from main frame 10 and a different sub-frame 18 moved to position and attached, with a minimum amount of effort and time. Such conventional parts as have been illustrated as having a place on sub-frame 18 do not form a part of the invention, only so far as they constitute a part of the removable unitary power unit, of which sub-frame 18 is the essential member. It is, therefore, understood that motor vehicles embodying this invention might be made to present different physical characteristics than those illustrated and described without departing from the spirit of the invention or scope of the appended claims.

Having thus described the invention, what is claimed as new and desired to be secured by Letters Patent is:

1. In a motor vehicle of the character described, a power unit including a drive wheel, an engine and a sub-frame to hold the said engine and the wheel in operative relation; a main frame having steering wheels thereon; means for pivotally securing one end of the sub-frame to the main frame; shock absorbing elements joining the sub-frame and the main frame at a point remote from the pivotal means; and structure for removably securing the pivotal means and the shock absorbing elements to the sub-frame whereby the power unit may be bodily separated from the main frame, said drive wheel being at the opposite end of the sub-frame adjacent to the shock absorbing elements.

2. In a motor vehicle of the character described, a power unit including a drive wheel, an engine and a sub-frame to hold the said engine and the wheel in operative relation; a main frame; and structure for removably securing the sub-frame to the main frame whereby the power unit may be bodily separated from the main frame, said structure including a device pivotally joining one end of the sub-frame and the main frame, the said drive wheel being at the opposite end of the sub-frame, said sub-frame having shock absorbing elements interposed between the opposite end thereof and the main frame.

3. In a motor vehicle of the character described, a power unit including a drive wheel, an engine and a sub-frame to hold the said engine and the wheel in operative relation; a main frame; and structure for removably securing the sub-frame to the main frame whereby the power unit may be bodily separated from the main frame, said main frame and the sub-frame being pivotally interconnected by a transverse shaft journalled in the main frame, said frame having a lifting jack geared to each end respectively of the shaft and operable when the shaft is rotated about its axis.

4. In a motor vehicle of the character described, a power unit including a drive wheel, an engine and a sub-frame to hold the said engine and the wheel in operative relation; a main frame; structure for removably securing the sub-frame to the main frame whereby the power unit may be bodily separated from the main frame; a lifting jack carried by the main frame at each side thereof; and a transverse shaft pivotally joining the sub-frame to the main frame, said shaft being joined to the lifting jacks to operate the same when the shaft is rotated about its axis, said sub-frame having one end thereof detachably fastened to the shaft.

JOHN P. MARCY.